United States Patent [19]

Noda et al.

[11] 4,203,815

[45] May 20, 1980

[54] PROCESS FOR PRODUCING CROSSLINKED AND FOAMED RESIN SHEET

[75] Inventors: Yoichiro Noda, Ohtone; Michio Matsumura, Saitama; Norio Chiba; Masahito Hata, both of Hasuda, all of Japan

[73] Assignee: Sekisui Kagaku Kogyo Kabushiki Kaisha, Osaka, Japan

[21] Appl. No.: 886,580

[22] Filed: Mar. 14, 1978

[51] Int. Cl.$^2$ .......................... B01J 1/10; B29D 27/00
[52] U.S. Cl. ........................... 204/159.2; 204/159.17; 204/159.24; 264/25; 264/54; 264/DIG. 5; 264/DIG. 18; 521/79; 521/81; 521/134; 521/140; 521/143; 521/144; 521/145; 521/148
[58] Field of Search ............... 264/25, DIG. 18, 54, 264/DIG. 5; 204/159.24, 159.2, 159.17; 521/79, 81, 134, 139, 140, 143, 144, 145, 148

[56] References Cited

U.S. PATENT DOCUMENTS

| | | | |
|---|---|---|---|
| 2,952,594 | 9/1960 | Rubens | 264/DIG.18 |
| 3,098,831 | 7/1963 | Carr | 264/DIG. 18 |
| 3,098,832 | 7/1963 | Pooley et al. | 264/DIG. 18 |
| 3,562,367 | 2/1971 | Shinohara et al. | 264/DIG. 18 |
| 3,840,448 | 10/1974 | Osborn et al. | 204/159.24 X |

FOREIGN PATENT DOCUMENTS 51-35226 10/1976 Japan.
850965 10/1960 United Kingdom.

*Primary Examiner*—Philip Anderson
*Attorney, Agent, or Firm*—Wenderoth, Lind & Ponack

[57] ABSTRACT

A process for producing a crosslinked and foamed resin sheet which comprises shaping a resinous mixture comprising a thermoplastic synthetic resin and a heat-decomposable blowing agent into a sheet form, applying a high-energy ionizing radiation to the resulting foamable resin sheet to crosslink the resin sheet, and then heating the resulting crosslinked foamable resin sheet to the decomposition temperature of the blowing agent or to a higher temperature; wherein the high-energy ionizing radiation has a range of at least 0.7 $\rho$d g/cm$^2$ in which d is the thickness in cm of the foamable resin sheet, and $\rho$ is the density in g/cm$^3$ of the foamable resin sheet, and a low-energy ionizing radiation with a range of not more than 0.6 $\rho$d g/cm$^2$ in which d and $\rho$ are as defined is applied to the foamable resin sheet before, during or after the application of the high-energy ionizing radiation.

14 Claims, No Drawings

PROCESS FOR PRODUCING CROSSLINKED AND FOAMED RESIN SHEET

This invention relates to a process for producing a crosslinked and foamed resin sheet, and more specifically to a process for producing a crosslinked and foamed resin sheet composed basically of a synthetic thermoplastic resin, which is free from surface roughness, has a high surface strength, and can be satisfactorily processed by, for example, embossing.

Various processes for producing crosslinked and foamed resin sheets composed basically of a thermoplastic resin such as an olefin or vinyl chloride resin have been reported. Those generally employed in the art include, for example, a process for producing a crosslinked and foamed resin shaped article, which comprises mixing such a resin with a heat-decomposable blowing agent and a crosslinking agent with or without a polyfunctional monomer, shaping the mixture into a desired shape such as a sheet, heating the resulting shaped article at a temperature above the decomposition temperature of the crosslinking agent but lower than the heat decomposition temperature of the blowing agent to crosslink the shaped article, and then heating the crosslinked article to the decomposition temperature of the blowing agent or to a higher temperature, or heating the shaped article to the heat-decomposition temperature or to a higher temperature to crosslink and foam the article simultaneously (see, for example, Japanese Patent Publications Nos. 17694/60, 14335/68, and 11375/68); and a process for producing a crosslinked and foamed resin shaped article, which comprises mixing a thermoplastic resin such as an olefin or vinyl chloride resin with a heat-decomposable blowing agent with or without a polyfunctional monomer, shaping the mixture into a desired shape such as a sheet, irradiating ionizing radiation to the resulting shaped article to crosslink the shaped article, and then heating the crosslinked article to the heat composition temperature of the blowing agent or to a higher temperature to foam the article (see, for example, British Pat. No. 850,965, and Japanese Pat. Publications Nos. 24131/64 and 29187/65).

The foamed resin articles obtained by these conventional processes, however, have the defect that because the expansion ratios of these articles are the same both at their inner and surface layers, the strength of the surface layer of the articles is weak; and consequently the articles readily undergo damages by an external force and cannot be used in applications which require strength higher than a certain point. Furthermore, since the resin articles have a low density also at their surface layer, an embossed design cannot be clearly reproduced when processing the article by embossing. In addition, the surface layer of the foamed article has a high ratio of expansion same as in the inner layer and is also weak to heat. When azodicarbonamide is used as the blowing agent, the resulting foamed shaped article has a colored surface, and to remove this coloration, the article must be heated. If it is heated until the color is removed, the resin on the surface of the shaped article melts and the surface becomes rough.

In an attempt to remove these defects of the prior techniques, methods have been suggested which involve bonding or heat-sealing a thermoplastic resin sheet or a low-expansion foamed sheet of thermoplastic resin to the surface of such a crosslinked and foamed article. These methods, however, have the defect that the operation is complicated, and the cost of production is high.

Japanese Patent Publication No. 35,226/76 suggested a process for producing a crosslinked and foamed resin sheet having a cell density differing between its surface layer and inner layer, which comprises irradiating the surface of a sheet of a foamable thermoplastic resin containing a heat-decomposable blowing agent with ionizing radiation two or more times at different incidence angles with respect to the surface of the sheet thereby to crosslink the foamble thermoplastic resin sheet, and then heating the crosslinked sheet to the decomposition temperature of the blowing agent or to a higher temperature to form the crosslinked foamble thermoplastic resin sheet. To attain a high density selectively at the surface layer, the irradiating angle (the angle formed between the irradiated rays and the sheet surface) of ionizing radiation should be small. However, if this irradiating angle is smaller than 30°, reflection of the ionizing radiation increases, and its loss is great. Since the distance between the irradiation surface and the irradiation source increases at this time, the irradiated rays increasingly diffuse before they reach the sheet surface, and the loss of the irradiating rays is also great. For example, when the irradiating angle is 30°, the efficiency of irradiation is as low as 25%, and 75% of the irradiated rays are wasted. If, on the other hand, the irradiating angle becomes larger than 30°, the ionizing radiation progressively reaches a farther point and finally the inner layer of the sheet, and therefore, the purpose of selectively providing a foamed surface layer having a high density (i.e., a high degree of crosslinking) cannot be achieved.

It is an object of this invention therefore to provide a process for producing a crosslinked and foamed resin shaped article which is free from the aforesaid defects.

Another object of this invention is to provide a crosslinked and foamed resin shaped article composed mainly of a thermoplastic resin, which is free from surface roughness, has a high surface strength, can be processed satisfactorily by, for example, embossing, and has a surface layer of a density (i.e., a high degree of crosslinking) and a low density (i.e., a low degree of crosslinking and a high expansion ratio).

Other objects and advantages of this invention will become apparent from the following description.

According to this invention, there is provided a process for producing a crosslinked and foamed resin sheet which comprises shaping a resinous mixture comprising a thermoplastic synthetic resin and a heat-decomposable blowing agent into a sheet form, applying a high-energy ionizing radiation to the resulting foamble resin sheet to cross-link the resin sheet, and then heating the resulting cross-linked foamble resin sheet to the decomposition temperature of the blowing agent or to a higher temperature, wherein the high-energy ionizing radiation has a range of at least 0.7 $\rho d$ g/cm$^2$ in which $\rho$ is the density in g/cm$^3$ of the foamable resin sheet and d is the thickness in cm of the foamble resin sheet, and a low-energy ionizing radiation with a range of not more than 0.6 $\rho d$ g/cm$^2$ is applied to the foamble resin sheet before, during or after the application of the high-energy ionizing radiation.

The thermoplastic synthetic resin may be any type which can be shaped into a sheet form and has the property of self-crosslinking upon the application of ionizing radiation. Thermoplastic synthetic resins which can be especially suitably used in this invention include olefin resins and vinyl chloride resins.

The term "olefin resin," as used in the present specification and the appended claims, is meant to include not only a homopolymer of an olefin, but also an olefin copolymer composed of at least 50 mole%, preferably at least 70 mole%, of at least one olefin unit and the remainder being another monomer copolymerizable with the olefin, and a blend of at least 50% by weight, preferably at least 60% by weight, of the olefin homopolymer or copolymer with another polymer.

Examples of the olefin are ethylene, propylene, butylene, and hexene, and lower olefins having not more than 6, preferably not more than 4, carbon atoms are preferred. Examples of monomers copolymerizable with the olefin are vinyl acetate, vinyl chloride, acrylic acid and its esters, and methacrylic acid and its esters. Typical examples of the olefin resin that can be used in this invention include polyethylene, polypropylene, polybutylene, an ethylene/propylene copolymer, an ethylene/vinyl acetate copolymer, and an ethylene/vinyl chloride copolymer. They can be used either alone or as a blend of two or more.

The other polymer that can be blended with the olefin homopolymer or copolymer may be any polymer compatible with it. Examples are polybutadiene, polyisoprene, polychloroprene, chlorinated polyethylene, polyvinyl chloride, a styrene/butadiene copolymer, a vinyl acetate/ethylene copolymer, an acrylonitrile/butadiene copolymer, a vinyl chloride/vinyl acetate copolymer, and butadiene copolymers.

Likewise, the term "vinyl chloride resin," as used in the present specification and the appended claims, is meant to include not only a homopolymer of vinyl chloride, but also a vinyl chloride copolymer composed of at least 50 mole%, preferably at least 70 mole%, of a vinyl chloride unit and a minor proportion of another monomer copolymerizable with vinyl chloride, and a blend of at least 50% by weight, preferably 60% by weight, of the vinyl chloride polymer or copolymer with another polymer.

Typical examples of the monomer copolymerizable with vinyl chloride are ethylene, vinyl acetate, and vinylidene chloride. Examples of the other polymer that can be blended with the vinyl chloride homopolymer or copolymer are typically polyethylene, polyvinyl acetate and an ethylene/propylene copolymer.

An ethylene resin is especially suitable as the thermoplastic resin for use in this invention. Examples of the ethylene resin that can be advantageously employed in the invention are low-, medium- and high-density polyethylenes, an ethylene/vinyl acetate copolymer, an ethylene/propylene copolymer, a blend of polyethylene and polypropylene, a blend of polyethylene and an ethylene/vinyl acetate copolymer, and a blend of polyethylene and an ethylene/propylene copolymer. Of these, the medium-density polyethylene, low-density polyethylene and the ethylene/propylene copolymer are especially suitable.

Preferably, the ethylene resins have a softening point of less than 130° C., and a melt index of 2.0 to 20, a number average molecular weight of 20,000 to 60,000, an intrinsic viscosity, at 75° C. in xylene, of 0.8 to 1.1, and a density of 0.910 to 0.940.

The heat-decomposable blowing agent used in this invention is solid at ordinary temperatures and has a higher decomposition temperature than the melt-shaping temperature of the resin with which it is mixed. It further has the property of decomposing with the evolution of gases such as nitrogen gas, carbon dioxide gas or ammonia gas when heated to its decomposition temperature or to a higher temperature. Any conventional heat-decomposable blowing agents used heretofore in the production of thermoplastic resin foams are feasible in the present invention. Especially preferred blowing agents are those which decompose at a temperature of more than 140° C., preferably between 170° and 220° C., to generate gases. Specific examples include azodicarbonamide and its metal salts, hydrazodicarbonamide, N,N'-dinitrosopentamethylene tetramine, azobisisobutyronitrile, bis-benzenesulfonyl hydrazide, 4,4'-hydroxy-bis(benzenesulfonyl semicarbazide), and toluenesulfonyl hydrazide. Azodicarbonamide is especially advantageous because of its good thermal stability and suitable decomposition temperature. These blowing agents can be used either alone or as mixtures. The amount of the blowing agent can be varied over a wide range according, for example, to the degree of expansion required of the final foamed shaped article. Usually, its amount is at least 0.1 part by weight, preferably 1 to 100 parts by weight, most preferably 2 to 80 parts by weight, per 100 parts by weight of the thermoplastic resin.

The blowing agent is mixed with the thermoplastic synthetic resin. As required, to facilitate the expansion of the resin by the heat decomposition of the blowing agent, the mixture may be incorporated with conventional foaming assistants such as oxalic acid, boric acid, zinc oxide, zinc stearate, lead stearate and zinc octanoate. The amount of such a foaming assistant is not critical, and can be varied broadly according to the type of the blowing agent, etc. Generally, the amount of the assistant is 0.01 to 50 parts by weight, preferably 0.1 to 10 parts by weight, per 100 per parts by weight of the thermoplastic resin.

If desired, the mixture may contain conventional additives such as coloring agents (e.g., cadmium yellow, quinacridone red, cobalt blue, cadmium red, red iron oxide, titanium oxide, zinc oxide, and carbon black); nucleating agents (e.g., talc, diatomaceous earth, calcium carbonate, zinc stearate, and aluminum stearate); lubricants (e.g., paraffin, or stearic acid); stabilizer (e.g., 2-hydroxy-4-methoxybenzophenone, or 2,6-ditert-butyl hydroxytoluene); fire retardants (e.g., antimony oxide, and chlorinated paraffin); fillers (e.g., calcium oxide, magnesium oxide, sodium carbonate, potassium carbonate, strontium carbonate, barium sulfate, lithopone, magnesium carbonate, calcium carbonate, silica, kaolin clay, and talc); plasticizers (e.g., dioctyl phthalate, dioctyl adipate and di-isodecyl phthalate); antistatic agents (e.g., a dialkyl phosphate salt, and an alkylaryl sulfonate); and deterioration inhibitors (e.g., t-butyl p-cresol and dilauryl thiopropionate) in the amounts usually employed in the art.

According to the process of the invention, the resinous mixture comprising the thermoplastic synthetic resin and the heat-decomposable blowing agent, with or without the optional ingredients described above, are melt-kneaded at a temperature lower than the decomposition temperature of the heat-decomposable blowing agent, and then shaped.

Mixing of the ingredients can be performed by conventional means, for example, using a kneader, blender or mixer. The melt-kneading can be carried out using, for example, an extruder, roll, or injection molding machine in which the thermoplastic resin is melted by heat and kneaded with the other ingredients.

The temperature for melt-kneading is above the melting temperature or softening temperature of the thermoplastic resin used and below the decomposition temperature of the heat-decomposable blowing agent. Accordingly, it is difficult to determine the melt-kneading temperature unequivocally, and the temperature is properly determined according to the type of the bonding agent used or the type of the thermoplastic resin used, etc. Usually, the melt-kneading temperature is preferably about 110 to about 150° C., more preferably about 120 to about 140° C. It is sufficient to perform kneading for about 1 to 10 minutes at this temperature.

The melt-kneading composition is then fabricated into a sheet form. The fabrication can be performed by a known method such as extrusion molding, injection molding or roll molding.

In the manner described hereinabove, a foamable resin sheet can be obtained. The thickness of the resin sheet is not strictly restricted, and can be varied over a wide range according to the usage of the final product. Generally, its thickness is at least 0.1 mm, preferably 0.2 to 30 mm, more preferably 0.3 to 20 mm. The density of the foamable resin sheet is neither critical, and can be changed broadly according to the usage of the final product, etc. Generally, the density is at least $0.5 \text{ g/cm}^3$, preferably 0.8 to $2 \text{ g/cm}^3$, especially 0.9 to $1.5 \text{ g/cm}^3$.

The foamable resin sheet is then exposed to high-energy ionizing radiation to crosslink the thermoplastic resin constituting the sheet, and to render the sheet suitable for foaming.

The term "ionizing radiation," as used in the present specification and the appended claims, denotes electromagnetic waves or charged particles having the ability to interact directly or indirectly with a substance and consequently ionizing the substance. In the present invention, all sources of ionizing radiation which are usually employed to crosslink synthetic resins are feasible. Examples of such sources are electron beams, X-rays, $\beta$-rays, and $\gamma$-rays.

The high-energy ionizing radiation has such a strength as to permeate into the inside of the foamable resin sheet, and is applied under such irradiating conditions that crosslinking occurs over the entire thickness of the foamable resin sheet. The high-energy ionizing radiation can have a range of at least $0.7 \rho d \text{ g/cm}^2$, although it can be varied depending upon the thickness (d m) and density ($\rho \text{ g/cm}^3$) of the foamable resin sheet used. There is no special upper limit to the energy range, but too strong an energy will be wastful. Hence, it is preferably about 0.8 to $10 \rho d \text{ g/cm}^2$, especially about 0.9 to $6.0 \rho d \text{ g/cm}^2$. The dosage of the high-energy ionizing radiation depends upon the intensity of the radiation source, the type of the resin, the thickness of the sheet, etc., and cannot be determined definitely. Generally, the irradiation dosage is at least 0.1 Mrad, preferably 0.5 to 40 Mrads, more preferably 1 to 20 Mrads.

The high-energy ionizing radiation can be applied until the thermoplastic resin in the foamable resin sheet crosslinks to the desired degree of crosslinking. The degree of crosslinking is expressed by the gel content of the resin, and it is advantageous to perform the ionizing radiation until the foamable resin sheet has a gel content of at least 5% by weight, usually 15 to 60% by weight.

The greatest characteristic of the present invention is that before, during or after the application of the high energy ionizing radiation, a low-energy ionizing radiation is applied to the foamable resin sheet.

The purpose of applying the low-energy ionizing radiation is to crosslink only the surface layer of the foamable resin sheet. Accordingly, the ionizing radiation used for this purpose has a lower level of energy than the high-energy ionizing radiation which is used to crosslink the foamable resin sheet entirely in its thickness direction. The low-energy ionizing radiation used in this invention advantageously has a range of not more than $0.6 \rho d \text{ g/cm}^2$, although the range can be varied according to the thickness (d m) and density ($\rho \text{ g/cm}^3$) of the foamable resin sheet. Preferably, it may have a range of 0.1 to $0.5 \rho d \text{ g/cm}^2$, more preferably 0.15 to $0.4 \rho d \text{ g/cm}^2$.

The dosage of the low-energy ionizing radiation is not critical, and depends upon the type of the resin constituting the sheet, the thickness of the sheet, etc. Advantageously, the dosage is generally 0.1 to 60 Mrads, preferably 0.5 to 40 Mrads, and more preferably 1 to 30 Mrads.

The high-energy and low-energy ionizing radiations can be applied by an ordinary radiation devices such as a nuclear reactor, a cobalt 60 $\gamma$-ray irradiating device, and an electron beam accelerator (e.g., the Vande Graaff type, resonance type, or straight line type).

The low-energy ionizing radiation can be applied before or during the application of the high-energy ionizing radiation. Or this can be performed after the application of the high-energy ionizing radiation and before the heating step to be described. Or the irradiation may be performed through two or more stages mentioned. For example, it can be performed continuously before and during the application of the high-energy ionizing radiation, or during and after the application of the high-energy ionizing radiation.

The ionizing radiation may be applied to one or both surfaces of the foamable resin sheet. When it is desired to obtain a foamed and crosslinked resin sheet whose both surface layers are crosslinked to a high degree, the low-energy ionizing radiation should be applied to both surfaces of the foamable resin sheet.

The procedure described above affords a foamable resin sheet in which at least a part of its surface layer has been crosslinked to a higher degree than its inner layer. The crosslinked foamable resin sheet is then heated to the decomposition temperature of the heat-decomposable blowing agent or to a higher temperature to foam it.

The heating temperature varies according to the type of the blowing agent. Usually, however, it is at least 180° C., preferably 200° to 300° C. Foaming can be completed generally within 1 to 20 minutes.

The heating is performed by an ordinary method, for example in a heating oven.

Since according to the process of this invention, a low-energy ionizing radiation is applied to at least one surface of the foamable resin sheet to crosslink only the surface layer of the sheet in addition to the application of a high-energy ionizing radiation for the crosslinking of the entire sheet, the inner layer of the foamable sheet is crosslinked to a degree suitable for foaming, and its surface layer is crosslinked to a higher degree than the inner layer. After the end of foaming, therefore, a foamed and crosslinked resin sheet can be obtained which has a surface layer having a lower expansion ratio than the inner layer and a high physical strength.

In addition, the sheet obtained by this invention is free from surface roughness, and its surface is crosslinked at a high crosslinking density. Hence, a clear embossed design can be imparted to the surface of the resulting sheet.

The crosslinked and foamed resin sheet prepared by the present invention can be used in various applications, for example as interior finishing materials (wall materials) for buildings or motor vehicles, heat-resistant materials, mats, and cushioning materials.

The following Examples and Comparative Examples illustrate the present invention specifically.

EXAMPLE 1

A mixture consisting of 100 parts by weight of low-density polyethylene (having a melt index of 7.0 and a density of 0.920) and 13 parts by weight of azodicarbonamide was fed into a monoaxial extruder to form a foamable sheet having a density of 0.98 g/cm³ and a thickness of 3.0 mm.

The sheet was fed to an electron beam accelerator, and an ionizing radiation having a high energy with a range of 0.8 g/cm² was applied to the top and bottom surfaces of the sheet in a dose of 3 Mrads. Then, an ionizing radiation of low energy with a range of 0.08 g/cm² was applied to the top and bottom surfaces of the sheet by using the same electron beam accelerator in each of the doses indicated in Table 1 (Runs Nos. 1 to 5). The sheet was then fed into a heat-foaming oven, and heated at 230° C. for 4 minutes to afford a foamed sheet.

The thickness of the surface layer of the foamed sheet, the cell diameters at the surface layer and the inner layer of the sheet, the apparent density and the surface strength of the sheet were measured, and its surface condition was also observed. The results are shown in Table 1.

The resulting foamed sheets were free from surface roughness, and cells on their surface layers were very compact and the surface strength was high. The resulting resin sheets could be satisfactorily embossed.

COMPARATIVE EXAMPLE 1

The same resinous mixture as used in Example 1 was formed into a foamable sheet in the same way in Example 1, and the sheet was crosslinked by application of a high-energy ionizing radiation. Application of a low-energy ionizing radiation was omitted. The crosslinked sheet was fed into a heat-foaming oven, and heated at 230° C. for 4 minutes to afford a foamed sheet.

The foamed sheet was evaluated in the same way as in Example 1, and the results are shown in Table 1 (Run No. 6).

Table 1

|  | Example 1 | | | | | Comparative Example 1 |
|---|---|---|---|---|---|---|
| Run No. | 1 | 2 | 3 | 4 | 5 | 6 |
| Dose of the low-energy ionizing radiation (Mrads) | 2 | 4 | 6 | 8 | 10 | 0 |
| Thickness ($\mu$) of the surface layer | 250 | 200 | 150 | 150 | 150 | 0 |
| Cell diameter ($\mu$) | | | | | | |
| Surface layer | 100–200 | 30–60 | less than 10 | less than 10 | less than 10 | 350–450 |
| Inner layer | 300–400 | 300–400 | 300–400 | 300–400 | 300–400 | 300–400 |
| Apparent density (g/cm³) | | | | | | |
| Surface layer | 0.080 | 0.175 | 0.286 | 0.303 | 0.313 | 0.035 |
| Inner layer | 0.030 | 0.032 | 0.031 | 0.030 | 0.030 | 0.036 |
| Entire sheet | 0.036 | 0.038 | 0.042 | 0.040 | 0.042 | 0.035 |
| Surface strength (kg) | 0.5 | 1.0 | 1.3 | 1.5 | 1.5 | 0.1 |
| Surface roughness | None | None | None | None | None | Slight |

The surface strength was determined as follows: A rounded stainless steel nail with its tip having a radius of 0.5 mm was applied to a sample foamed sheet at an angle to 75°. A load was exerted on the tip of the nail, and the sample was pulled at a speed of 5 meters/min. The load at which the surface of the sample was broken was measured, and made the surface strength.

EXAMPLE 2

A mixture consisting of 100 parts by weight of low-density polyethylene (having a melt index of 2.0 and a density of 0.924) and 15 parts by weight of azodicarbonamide was formed into a foamable sheet with a thickness of 3 mm and a density of 0.99 g/cm³ in the same way as in Example 1. A high-energy ionizing radiation having a range of 0.8 g/cm² was applied to the top and bottom surfaces of the sheet in a dose of 5 Mrads using an electron beam accelerator. A low-energy ionizing radiation with each of the ranges shown in Table 2 was applied in a dose of 10 Mrads to the top and bottom surfaces of the sheet by the same electron beam accelerator. The sheet was then fed into a heat-foaming oven, and heated at 230° C. for 4 minutes.

The density, surface strength and embossability of each of the resulting foamed sheets were determined, and the results are given in Table 2.

The results show that when a short-range ionizing radiation (low-energy ionizing radiation) was applied additionally, the cells on the surface layer were compact, and the strength of the surface layer was high; and that the product exhibited good embossability. However, when only the long-range ionizing radiation (high-energy ionizing radiation) as in Comparative Example 2 given below was applied, the entire sheet was crosslinked to almost the same extent, and the cells on the surface were not compact. Thus, the product had a low surface strength, and poor embossability.

Comparative Example 2

The same resinous mixture as in Example 2 was shaped into a foamable sheet in the same way as in Example 2. The sheet was crosslinked by a high-energy ionizing radiation in the same way as in Example 2. The sheet was further exposed to a high-energy ionizing radiation (with a range of 0.8 g/cm²) under the same conditions as the crosslinking in a dose of 10 Mrads. The sheet was treated in the same way as in Example 2 to afford a foamed sheet.

The foamed sheet was evaluated in the same way as in Example 2, and the results are shown in Table 2.

Comparative Example 3

The same resinous mixture as used in Example 2 was shaped into a foamable sheet. The sheet was exposed to a high-energy ionizing radiation in the same way as in Example 2 (the application of a low-energy ionizing radiation was omitted), and immediately then, heated in a heat-foaming oven in the same way as in Example 2 to afford a foamed sheet.

The foamed sheet was evaluated in the same way as in Example 2, and the results are shown in Table 2.

Table 2

|  |  | Example 2 |  | Comparative Ex. 2 | Comparative Ex. 3 |
|---|---|---|---|---|---|
|  |  | 1 | 2 |  |  |
| Crosslinking by the low-energy ionizing radiation | Range (g/cm²) | 0.05 | 0.10 | 0.80* | Not applied |
|  | Dose (Mrads) | 10.0 | 10.0 | 10.0 |  |
| Density (g/cm³) | Surface layer | 0.304 | 0.098 | 0.043 | 0.029 |
|  | Inner layer | 0.030 | 0.030 | 0.062 | 0.034 |
|  | Entire sheet | 0.038 | 0.036 | 0.056 | 0.032 |
| Surface strength (kg) |  | 1.6 | 0.7 | 0.1 | 0.1 |
| Embossability |  | Good | Good | Poor | Poor |

*Crosslinked by application of high-energy ionizing radiation.

EXAMPLE 3

| Polyvinyl chloride (average degree of polymerization, 1000) | 100 | parts by weight |
|---|---|---|
| Dioctyl phthalate | 36 |  |
| Azodicarbonamide | 15 |  |
| Calcium stearate | 1 |  |
| Zinc stearate | 1 |  |
| Trimethylolpropane trimethacrylate (vulcanization accelerator) | 2 |  |
| Dioctyltin maleate | 0.5 |  |

A mixture of the above ingredients was fed into a a biaxial extruder to form a foamable resin sheet having a thickness of 2 mm and a density of 1.35 g/cm³.

The sheet was fed into a cobalt 60 irradiating device, and cobalt 60 was irradiated to each of the top and bottom surfaces of the sheet in a dose of 3 Mrads at a dose rate of 0.15 Mrad/hr (range 11.5 g/cm²). Then, an ionizing radiation of a low energy with a range of 0.08 g/cm² was applied in a dose of 5 Mrads to each of the top and bottom surfaces of the sheet. The sheet was then fed into a heat-foaming oven, and heated at 230° C. for 10 minutes to afford a foamed sheet.

The sheet had the following characteristics.
Surface layer thickness: 150μ

| Cell diameter |  |
|---|---|
| Surface layer: | less than 10 μ |
| Inner layer: | 300 to 400 μ |
| Apparent density |  |
| Surface layer: | 0.306 g/cm³ |
| Inner layer: | 0.029 g/cm³ |
| Entire sheet: | 0.037 g/cm³ |
| Surface strength: | 1.5 kg |
| Surface roughness: | None |

What we claim is:

1. A process for producing a crosslinked and foamed resin sheet which comprises shaping a resinous mixture comprising a thermoplastic synthetic resin and a heat-decomposable blowing agent into a sheet form, applying high-energy and low-energy ionizing radiation to the resulting foamable resin sheet to crosslink the resin sheet, and then heating the resulting crosslinked foamable resin sheet to a temperature at which the blowing agent decomposes, wherein the high-energy ionizing radiation is at least 0.7 $\rho d$ g/cm² in which d is the thickness of cm of the foamable resin sheet, and $\rho$ is the density in g/cm³ of the foamable resin sheet, and wherein the low-energy ionizing radiation is not more than 0.6 $\rho d$ g/cm² in which d and $\rho$ are as defined, and the low-energy ionizing radiation is applied to the foamable resin sheet before, during or after the application of the high-energy ionizing radiation and before heating the resulting cross-linked foamable resin sheet.

2. The process of claim 1 wherein the high-energy ionizing radiation has a range of 0.8 $\rho d$ to 10 $\rho d$ g/cm².

3. The process of claim 1 wherein the low-energy ionizing radiation has a range of 0.1 $\rho d$ to 0.5 $\rho d$ g/cm².

4. The process of claim 1 wherein the source of the ionizing radiation is an electron beam, or β-ray.

5. The process of claim 1 wherein the low-energy ionizing radiation is applied to the foamable resin after the application of the high-energy ionizing radiation.

6. The process of claim 1 wherein the high-energy ionizing radiation is applied in a dose of 0.1 to 40 Mrads.

7. The process of claim 1 wherein the low-energy ionizing radiation is applied in a dose of 0.1 to 60 Mrads.

8. The process of claim 1 wherein the foamable resin sheet has a thickness of 0.1 to 30 mm and a density of 0.8 to 2 g/cm³.

9. The process of claim 1 wherein the thermoplastic synthetic resin is an olefin resin or a vinyl chloride resin.

10. The process of claim 1 wherein the thermoplastic synthetic resin is an ethylene resin.

11. The process of claim 1 wherein the heat-decomposable blowing agent has a decomposition temperature of 170° to 220° C.

12. The process of claim 1, wherein the high-energy ionizing radiation has a range of from 0.7 $\rho$d to 10 $\rho$d g/cm$^2$ and the low-energy radiation has a range of 0.1 $\rho$d to 0.6 $\rho$d g/cm$^2$.

13. The process of claim 1, wherein the high-energy ionizing radiation has a range of 0.8 $\rho$d to 10 $\rho$d g/cm$^2$ and the low-energy ionizing radiation has a range of 0.1 $\rho$d to 0.5 $\rho$d g/cm$^2$.

14. A crosslinked and foamed resin sheet produced by the process of claim 1.

* * * * *